UNITED STATES PATENT OFFICE.

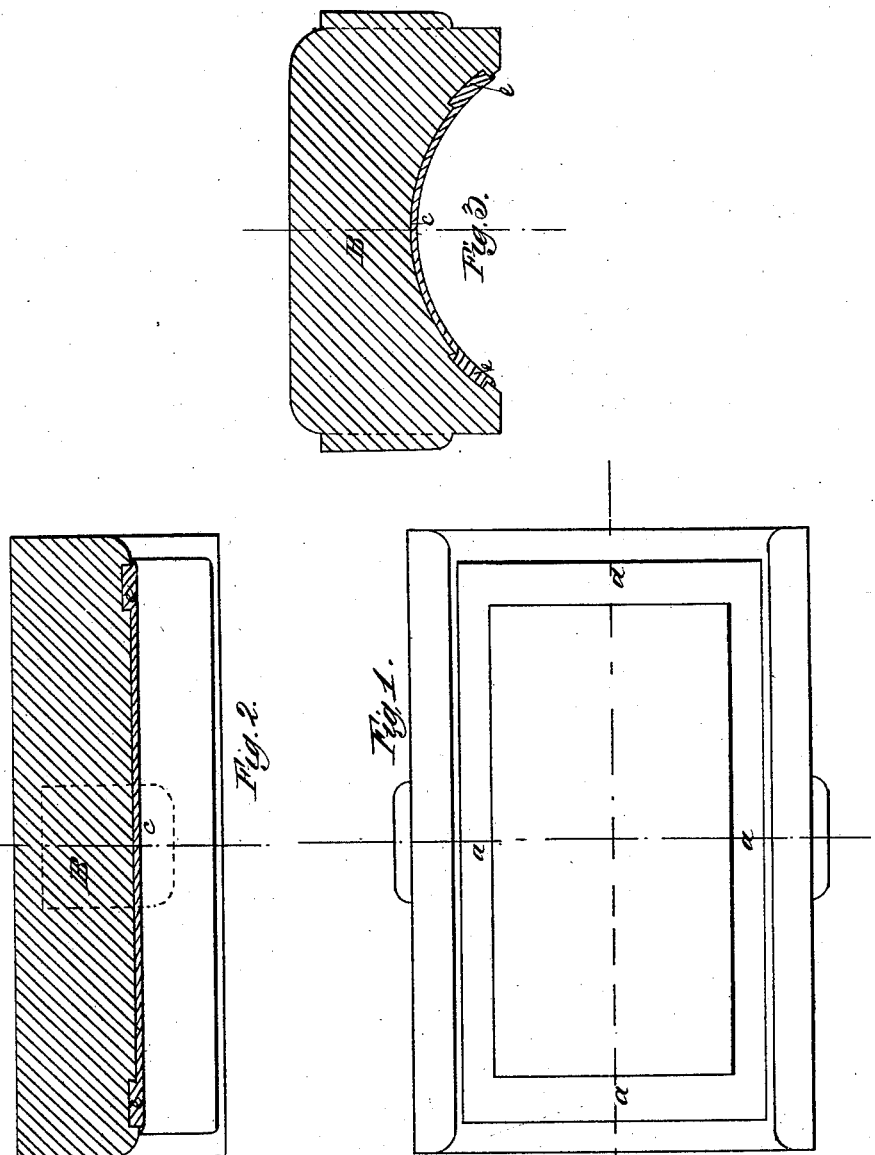

D. A. HOPKINS, OF JERSEY CITY, NEW JERSEY.

IMPROVEMENT IN JOURNAL-BEARINGS.

Specification forming part of Letters Patent No. 109,319, dated November 15, 1870.

*To all whom it may concern:*

Be it known that I, DAVID A. HOPKINS, of Jersey City, county of Hudson, and State of New Jersey, have invented a new and useful Improvement in the Construction of Journal-Bearings for Railway-Car and other Journals; and I do hereby declare that the following is a full, clear, and exact description of the same, reference being had to the annexed drawings, making a part of this specification, and to the figures and letters of reference marked thereon.

The nature of my invention consists in the combination, in a peculiar manner hereinafter described, of two wearing metals, one sufficiently hard and strong to serve as the bearing or wearing surface of a journal-box, and the other pliable enough to allow the journal of the axle, at the first running of the same in the box, to embed itself therein to such an extent as to secure so perfect a bearing that heating from lack of bearing contact is avoided to a very great extent, if not entirely.

In the annexed drawings, Figure 1 is a view of the under or bearing side of the hard-metal part of said bearing ready for receiving said lining. Fig. 2 is a longitudinal section of the same divided through the center and provided with said lining. Fig. 3 is a transverse section of the same divided through the center, and is also provided with said lining.

B is the hard-metal part of said bearing, and is made of any suitable material or compound and of any requisite form and size to adapt it to the housing or box and journal with which it is to be used, the groove *a* (shown in Fig. 1) being cast or otherwise formed and made widest at the bottom, as shown in Figs. 2 and 3, for the purpose of receiving and effectually holding to the last the flange *e* of said lining *c*, which is either cast or pressed into place, said lining being made by me of lead or of lead with a small percentage of tin and antimony.

The mode above described of securing the hard metal and lining of said bearing to each other is referred to only because that thereby the work is readily accomplished, and is not claimed by me as constituting any part of my said invention. Any process by which said lining may be held in place, as set forth, will answer the purpose contemplated.

The lining of bearings as above described is widely different from Babbitt's plan, to which it apparently bears some resemblance, the lining, in accordance with my plan, standing so far beyond the other part of said bearing as to receive the journal and give it the requisite amount of bearing-surface without permitting it to come in contact with the harder part of the bearing except by wearing its way through the lining, in doing which it wears for itself a proper bearing in the hard metal just as gradually as it wears through the lining, while by Babbitt's plan the hard and soft metal surfaces are even with each other, no benefit being sought or secured by the use of soft metal upon Babbitt's plan except from its greater durability and excellence as a wearing metal, while the compounds commonly known and used as "Babbitt's metal" are in nearly all cases so hard as to be unfit for a lining for the purpose contemplated by my invention. As a rule, I find that said lining should project from about one-sixteenth to one-eighth of an inch beyond the hard-metal part of the bearings. If it projects very much more and is soft enough to permit the journal to bed itself into it with only a few turns, as herein set forth, it is liable after a short time to yield to such extent as to escape somewhat at the ends and sides of the bearing, and to that degree be useless, while if it is too thin and the journal upon which it is placed is much more worn in some parts than in others the projecting parts or rings may pass through it and come in contact with the hard metal before a full bearing is obtained upon the more worn parts or grooves of the journal.

In practice it is often the case that proper alignment of a journal and its bearings is not secured, the results of which, with bearings constructed in the usual way, are binding and heating of the journal in its bearing until the binding is relieved by the wearing process, while in cases where renewals of large numbers of journal-bearings are daily required, as with railway-cars, the journals of which have undergone all degrees of change from their original form and size that may be safely permitted, the proper fitting of each bearing to the journal with which it is to be used is practically impossible, and generally is not attempted, adding to the difficulties arising from want of proper alignment and to the danger and number of "hot boxes;" but by the use of bearings constructed upon my plan, as hereinbefore set forth, said difficulties are mostly obviated by the yielding of the lining to the direction and form of the journal, as specified.

I am aware that Babbitt metal has been cast or run into a cavity of a journal-box; but this metal is only employed as the wearing metal. I also am aware that horn has been placed in a cavity of a journal-box for the same purpose contemplated by Babbitt. I therefore do not claim such contrivances as my invention; but What I do claim as my invention, and desire to secure by Letters Patent, is—

The method herein described of constructing journal-boxes, whereby the journals of axles are embedded therein, substantially as herein set forth.

D. A. HOPKINS.

Witnesses:
  A. OHLENSCHLAGER,
  G. E. JONES.